(12) United States Patent  
Pedersen

(10) Patent No.: US 8,982,918 B2
(45) Date of Patent: Mar. 17, 2015

(54) SYSTEM, DEVICE AND METHOD FOR STABILIZING THE OPTICAL OUTPUT POWER OF AN OPTICAL SYSTEM

(75) Inventor: Morten Ostergaard Pedersen, Risskov (DK)

(73) Assignee: NKT Photonics A/S, Birkerod (DK)

( * ) Notice: Subject to any disclaimer, the term of this patent is extended or adjusted under 35 U.S.C. 154(b) by 557 days.

(21) Appl. No.: 12/865,503

(22) Filed: Jul. 30, 2010

(65) Prior Publication Data

US 2010/0329292 A1    Dec. 30, 2010

Related U.S. Application Data

(63) Continuation-in-part of application No. PCT/DK2009/000026, filed on Feb. 2, 2009.

(30) Foreign Application Priority Data

Jan. 31, 2008    (DK) .................................. 2008 00143

(51) Int. Cl.
*H01S 3/067*    (2006.01)
*G02B 6/26*    (2006.01)
*G02B 6/42*    (2006.01)
*G02B 6/02*    (2006.01)
(Continued)

(52) U.S. Cl.
CPC .............. *G02B 6/262* (2013.01); *G02B 6/4203* (2013.01); *G02B 6/4206* (2013.01); *G02B 6/02376* (2013.01); *G02F 2001/3528* (2013.01); *H01S 3/0078* (2013.01); *H01S 3/02* (2013.01); *H01S 3/1305* (2013.01)
USPC ................. 372/38.01; 372/6; 372/23; 372/70

(58) Field of Classification Search
USPC ...................................... 372/38.01
See application file for complete search history.

(56) References Cited

U.S. PATENT DOCUMENTS 5,161,053 A * 11/1992 Dabbs ........................... 359/384
5,631,987 A   5/1997 Lasky et al.
(Continued)

FOREIGN PATENT DOCUMENTS

EP    0 886 174 A2    12/1998
EP    1 855 155 A1    11/2007
(Continued)

OTHER PUBLICATIONS

Japanese Office Action issued in corresponding Japanese Patent Application No. 2000-132465, dated Dec. 18, 2007 and English language translation thereof.
(Continued)

*Primary Examiner* — Xinning Niu
(74) *Attorney, Agent, or Firm* — Buchanan Ingersoll & Rooney PC

(57) ABSTRACT

A light source system for delivery of light including a light source having an output arranged to emit light in an output path, the output path including an unguided section and an at least partially transmissive optical component wherein the optical component provides at least one residual reflection when the system is in use and a detector system is arranged to detect said residual reflection. The detector is in one embodiment arranged to produce at least one feedback response arranged to stabilize the optical output of the light source system. Hereby a feedback may be implemented with little or no reduction of performance.

17 Claims, 13 Drawing Sheets

(51) Int. Cl.
*G02F 1/35* (2006.01)
*H01S 3/00* (2006.01)
*H01S 3/02* (2006.01)
*H01S 3/13* (2006.01)

(56) References Cited

U.S. PATENT DOCUMENTS

| | | | |
|---|---|---|---|
| 5,999,548 | A | 12/1999 | Mori et al. |
| 6,081,638 | A | 6/2000 | Zhou |
| 7,099,536 | B1 * | 8/2006 | Chandra ............... 385/33 |
| 7,787,503 | B2 | 8/2010 | Wadsworth |
| 2004/0042071 | A1 | 3/2004 | Sato |
| 2004/0213302 | A1 * | 10/2004 | Fermann et al. ............ 372/6 |
| 2005/0226576 | A1 | 10/2005 | Feder et al. |
| 2006/0198588 | A1 * | 9/2006 | Kuksenkov et al. ...... 385/122 |
| 2007/0086713 | A1 | 4/2007 | Ingmar et al. |
| 2009/0185161 | A1 | 7/2009 | Okuno |

FOREIGN PATENT DOCUMENTS

| | | |
|---|---|---|
| EP | 1 923 692 A1 | 5/2008 |
| JP | 2001-208939 | 8/2001 |
| JP | 2004-347716 | 12/2004 |
| JP | 2005-099510 | 4/2005 |
| WO | WO 96/41223 | 12/1996 |
| WO | WO 00/37974 | 6/2000 |
| WO | WO 02/29461 A1 | 4/2002 |
| WO | WO 03/078338 A2 | 9/2003 |
| WO | WO 2005/062113 A1 | 7/2005 |
| WO | WO 2007/083533 A1 | 7/2007 |

OTHER PUBLICATIONS

International-Type Search Report dated Nov. 5, 2008 by the European Patent Office in corresponding Danish Application No. PA 2008 00143.

International Search Report (Form PCT/ISA/210) and the Written Opinion of the International Searching Authority (Form PCT/ISA/237) dated Jan. 8, 2010, issued by the European Patent Office in corresponding International Application No. PCT/DK2009/000026.

Danish Search Report issued on Sep. 8, 2008 by the Danish Patent Office in corresponding Danish Application No. PA 2008 00143.

K. P. Hansen, "Dispersion Flattened Hybrid-Core Nonlinear Photonic Crystal Fiber," *Optics Express*, Jun. 30, 2003, pp. 1503-1509, vol. 11, No. 13, Optical Society of America, USA.

Andersen et al., U.S. Appl. No. 12/808,327, entitled "Mode-locked Fiber Laser with Improved Life-time of Saturable Absorber" filed on Aug. 3, 2010.

J.C. Knight et al. "All-Silica Single-Mode Optical Fiber With Photonic Crystal Cladding," *Optics Letters*, Oct. 1, 1996, pp. 1547-1549, vol. 21, No. 19, Optical Society of America, USA.

T. A. Birks et al., "2D Photonic Band Gap Structures in Fibre Form," *Photonic Band Gap Materials*, 1996, pp. 1-8, Kluwer.

Anders Bjarklev et al., "Fabrication of Photonic Crystal Fibres," *Photonic Crystal Fibres*, pp. 115-130, Chapter 4, Kluwer Academic Publishers, Norwell, Massachusetts, USA.

T. A. Birks et al., "Endlessly Single-Mode Photonic Crystal Fiber," *Optics Letters*, Jul. 1, 1997, pp. 961-963, vol. 22, No. 13, Optical Society of America, USA.

* cited by examiner

SYSTEM, DEVICE AND METHOD FOR STABILIZING THE OPTICAL OUTPUT POWER OF AN OPTICAL SYSTEM

TECHNICAL FIELD

The invention relates to a power stabilisation method for a light source system arranged to emit light with a power spectrum O having a width $w_O$, said system comprising a light source arranged to emit light with a power spectrum S.

BACKGROUND

In recent years light sources with broad spectra have immersed which appear to have a promising array of commercial application particularly due to relative high power with spatial properties suitable for coupling into fibers, such as single mode fibers. One class of such sources is referred to as supercontinuum light sources. Such sources are often designed by pumping a waveguide, often a fiber, with pulsed light having relatively high peak power and short pulse duration. The high peak power induces non-linear optical effects providing a broadening of the spectrum so that it may span one or more octaves. In this context so-called microstructured optical fibers are of particular interest as non-linear waveguides, as such fibers allow for large non-linear coefficient and posses a greater freedom than standard fibers in design of e.g. dispersion profiles, which may heavily influence supercontinuum generation. Supercontinuum light sources are known in for example from patents such as WO 2005/062113 and chapters 12 and 13 of R. Alfano: "The Supercontinuum Laser Source: Fundamentals with Updated References", Springer, N.Y., USA, 2006.

Microstructured fibers are sometimes also referred to as photonic crystal fibers (PCFs) or holey fibers (a special case of such fibers is sometimes referred to as photonic bandgab fiber (PBG)). This PCF comprises a cladding made of a transparent material in which an array of holes is embedded along the length of the fiber [J. C. Knight, et al., Opt. Lett. 21 (1996) p. 1547. Errata: Opt. Lett. 22 (1997) p. 484]. The holes are commonly arranged transversely in a periodic array and are filled with a material which has a lower refractive index than the rest of the cladding. The centre of the fiber commonly comprises a transparent region, which breaks the periodicity of the cladding and this region often functions as the core of the fiber. However, in principle this region need not be in the centre of the cross section. Commonly the cross section of the fiber comprises a core region comprising a core region material, surrounded by a cladding region comprising holes (optionally filled with air or a gas), solid or liquid micro-structural elements embedded in a cladding background material, both regions extending in a longitudinal direction of the optical fiber. Commonly the core will guide 80% or more of the light in the operating wavelengths of the fiber. Typically, both the core and the cladding are made from pure fused silica and the holes are filled with air. In a variation thereof the PCF comprises transversely arranged rods of another material instead of holes. Such fibers are e.g. disclosed in WO37974 which also discloses the PCFs with transversely arranged holes.

The PCF type is generally produced from rod shaped units which are stacked to form a preform, which thereafter is drawn in one ore more steps to form the final optical fiber. In 2D Photonic band gap structures in fiber form", T. A. Birks et al. "Photonic Band Gap Materials, Kluwer, 1996 is disclosed a method of producing a preform from rods in the form of capillary tubes by stacking the tubes. A method of fabrication of PCFs is also described in chapter IV, pp. 115-130 of "Photonic Crystal Fibers", Kluwer Academic Press, 2003, by Bjarklev, Broeng, and Bjarklev.

WO 3078338 discloses a method of producing a preform for a microstructured optical fiber wherein a plurality of elongate elements are placed parallel to each other in a vessel where after at least a portion of said vessel is filled with a silica-containing sol, which is dried and sintered.

SUMMARY

By way of the invention the inventors have provided a system and method for power stabilisation of supercontinuum light sources and other light sources with a wide spectrum or high power.

In one embodiment the invention relates to a light source system for delivery of light comprising a light source having an output arranged to emit light, spanning over at least one octave with at least 50 µW/nm, in an output path said output path comprising an unguided section and an at least partially transmissive optical component wherein said optical component provides at least one residual reflection when the system is in use and a detector system is arranged to detect said residual reflection via tap path arranged to collect at least part of said residual reflection wherein said detector system being arranged to produce at least one feedback response arranged to stabilize light delivered by said system. In this context stabilize is taken in its normal meaning i.e. that the light delivered by said system has decreased due to said feedback response all else equal. In principle said tap path may be any collection of optical components suitable for guiding at least part of said residual reflection to the detector of the detector system. In one embodiment the tap path comprises a collecting fiber. In one embodiment residual reflection is coupled directly to the collecting fiber from an end facit of the collecting fiber. In one embodiment one of more optical components, such as a lens, is arranged between the collecting fiber and the residual reflection to improve coupling. In one embodiment the collecting fiber is fiber with a relatively large core, such as a multimode fiber, which may facilitate simpler coupling to the fiber. By using a tap path, for example constituted by a multimode fiber, it may be possible to guide light from the residual reflection away from the unguided section. In one embodiment this is advantageous as the unguided section may be relatively small while at the same time a larger detector system is desirable. This may, as an example, be the case when the detector system comprises a spectrometer or adjustable filters. In the following the tap path is represented by a collecting fiber without limiting the scope of the invention to this embodiment.

In one embodiment said residual reflection originates from a transition from said unguided section to said transmissive optical component, and in one embodiment said residual reflection originates from a transition from said transmissive optical component to said unguided section. By way of the invention a feedback loop may be implemented without introducing additional optical components. Accordingly, no decrease in performance of the system is expected due to the implementation of the feedback. Additional optical components in the beam path may be particularly undesired for light sources with a wide spectrum since it is difficult to get anti reflection coatings spanning a wide spectrum, whence the additional components may have reflection losses in the order of 5% or more. There is often a correlation between the power of the optical output and the lifetime of the light source, so compensation may result in a reduced life time of the system. Furthermore, additional optical components may introduce additional aberrations particularly of a chromatic nature as a wide spectrum must be supported by the system in some embodiments. In the present context the term feedback response is taken to mean that the light source system incorporates a feedback loop allowing that the system to respond to changes by adjusting one or more components within the system. The feedback loop typically comprises a detector system comprising a photodetector, such as a photodiode or a spectrometer, and a decision point which responds to a change in the signal from detector by adjusting one or more components of the system typically via a feedback signal. Throughout the application the terms feedback, feedback loop, and feedback response is used interchangeably.

In one embodiment the invention is applicable for high power lasers as it may be difficult to provide anti reflection suitable for high optical intensity. Accordingly, in one embodiment the light source is a high power laser. In one embodiment a small beam is combined with a high optical power in a high power laser. In one embodiment laser light from the high power laser is delivered to a delivery head via an optical waveguide, such as a fiber. Inside said delivery head the light exits the waveguide and is manipulated, such a focused or collimated via at least one lens. In one embodiment it is desirable to maintain a compact delivery head which in turn limits the expansion available to said light thus resulting in high optical intensity. In one embodiment of a high power laser a small beam refers to a beam with a transverse diameter of less than or equal to 3 mm, such as less than or equal to 2 mm, such as less than or equal to 1 mm, less than or equal to 500 µm, less than or equal to 250 µm, less than or equal to 100 µm. In one embodiment of a high power laser high power is taken to mean that during operation the optical output light is arranged so that the peak power (for a pulsed laser) is more than or equal to 10 kW, such as more than or equal to 20 kW, such as more than or equal to 20 kW, such as more than or equal to 30 kW, such as more than or equal to 40 kW, such as more than or equal to 20 kW and/or the average power is more than or equal to 30 W, such as more than or equal to 50 W, such as more than or equal to 75 W, such as more than or equal to 100 W. In one embodiment of the invention said output and output path is at least partly located in a delivery head connected to the light source via a delivery fiber.

In one embodiment said light source is a fiber laser, such as a mode locked fiber laser, a DBR laser or a DFB laser.

In one embodiment the light source system is arranged to emit light with a power spectrum O having a width $w_O$, said system comprising a light source according to claim 1 where said ouput is arranged to emit light with a power spectrum S having a width $w_S$ and said detector system having a spectral response D at least partly overlapping S, said spectral response D having a width $w_D$, wherein said detector system being arranged to produce at least one feedback response arranged to influence the power spectrum O of the light source system. In one embodiment said detector system is getting its input from light that has been reflected at a reflecting surface. If this feedback is applied as part of a feedback loop to provide a substantially constant O, the stability of the light source system may be significantly improved.

In one embodiment of the invention the spectral density O of the optical output comprises n spectral lines with widths $w_{O1}$ to $w_{On}$. In one embodiment one or more of the spectral lines are applied in the application of the system whereas the remaining lines are ignored. In one embodiment, an application of a spectral line entails that the optical output of this line or those lines should be substantially constant, in which case the optical output O is considered to comprise this or these lines. In one embodiment the output spectrum O is only considered within the spectral range applied, such as within the spectral range where optical output stability is desirable and/or required by the application of the light source system.

In one embodiment of the invention the reflecting surface used for the detector system is situated after the optical filter, so that the optical signal in the detector system comprises at least part of the same spectral lines as the optical output signal from the filter, such as the same spectral lines.

In one embodiment, the invention relates to a method of stabilizing an optical output power spectrum O of an optical light source system, said power spectrum O having a width $w_O$, said system comprising a light source arranged to emit light with a power spectrum S having a width $w_S$, said light source system further comprising at least one detector system having a spectral response D at least partly overlapping S, said spectral response D having a width $w_D$ where $w_D<w_S$, said detector system being arranged to produce at least one feedback response arranged to stabilize the power spectrum O of the light source system.

In one embodiment, the invention relates to a light source system for delivery of light comprising a light source having an output arranged to emit light spanning over at least one octave with at least 50 µW/nm in an output path, said output path comprising filter having an input in said beam path and multiple exit beams including an output beam arranged to form at least part of light delivered by the system and a detector beam wherein said system comprises a detector system for detecting at least part the optical power of said detector beam, and said detector system is arranged to produce a feedback response suitable for stabilizing light delivered from said system. In this way the feedback may in one embodiment be implemented into the light source without introducing additional components in the beam path as the detected light is taken from an inherent exit beam from the filter not applied as part of the delivered light from the system. In one embodiment said filter has an adjustable output efficiency arranged to affect light delivered by the system and the feedback response adjusts said adjustable output efficiency. In one embodiment the feedback response based on detection of said detector beam adjusts one or more of the group of a pump laser of the light source, an amplifier of the light source, a pump source to an amplifier of the light source system, a dampening component, a variable polarization controller, a reflective component, a transmissive component, the output efficiency of a filter. In one embodiment the light exits the filter at least in a $1^{st}$ and a $-1^{st}$ order beams where there two beams substantially mirrors one another, i.e. comprises substantially the same spectral constant and with an optical power proportional to that of the other. One example of such as filter is a polychromatic acousto optical tunable filter (AOTF). In one embodiment one of the $1^{st}$ and a $-1^{st}$ order beams are used as the output beam of the filter and the other is used as the detector beam. In another embodiment the filter provides exit beams in $1^{st}$ and higher order beam where the higher order beam mirrors the $1^{st}$ order beam. In one such embodiment the output beam of the filter is arranged to be the $1^{st}$ order beam and the detector beam is higher order beam. In one embodiment one exit beam, typically the $0^{th}$ order beam, comprises substantially all of the spectrum generated by the light source except for no or reduced optical power at wavelengths coupled to another exit beam. In the context of the present text such an exit beam is referred to as a $0^{th}$ order beam unless otherwise clear. In one embodiment this exit beam is applied as the detector beam. In one embodiment the detector system comprises a filter arranged so the optical power in the spectrum at a wavelength or array of wavelengths are selectively detected by the detector system. In one embodiment this wavelength(s) is chosen to reside substantially near to the wavelength(s) in the output beam of the filter. In one embodiment this wavelength(s) is substantially identical to that of the output beam thereby utilizing light not diverted by the filter to other exit beams. In one such embodiment the feedback response adjust one or more components of the light source, rather than e.g. the efficiency of the filter, so that the ratio between light in the detector beam and the output beam is substantially constant. In one embodiment the detector system is arranged to detect the optical power within a range of wavelengths, such e.g. the visible range or part thereof. The inventors have found that in some embodiments the spectrum of light generated by the light source appear to be linked in segments so variations within a segment is substantially identical for all wavelengths in the segment. In this way the detector system may average a larger spectrum of wavelengths and allow the feedback response to be less sensitive to e.g. noise fluctuation in the spectrum and/or noise in the detector system. In one embodiment the detector system comprises a spectrometer as detector so that the feedback response may be based on a selectable amount of the detected spectrum.

DETAILED DESCRIPTION OF THE PREFERRED EMBODIMENTS

Figure 1:
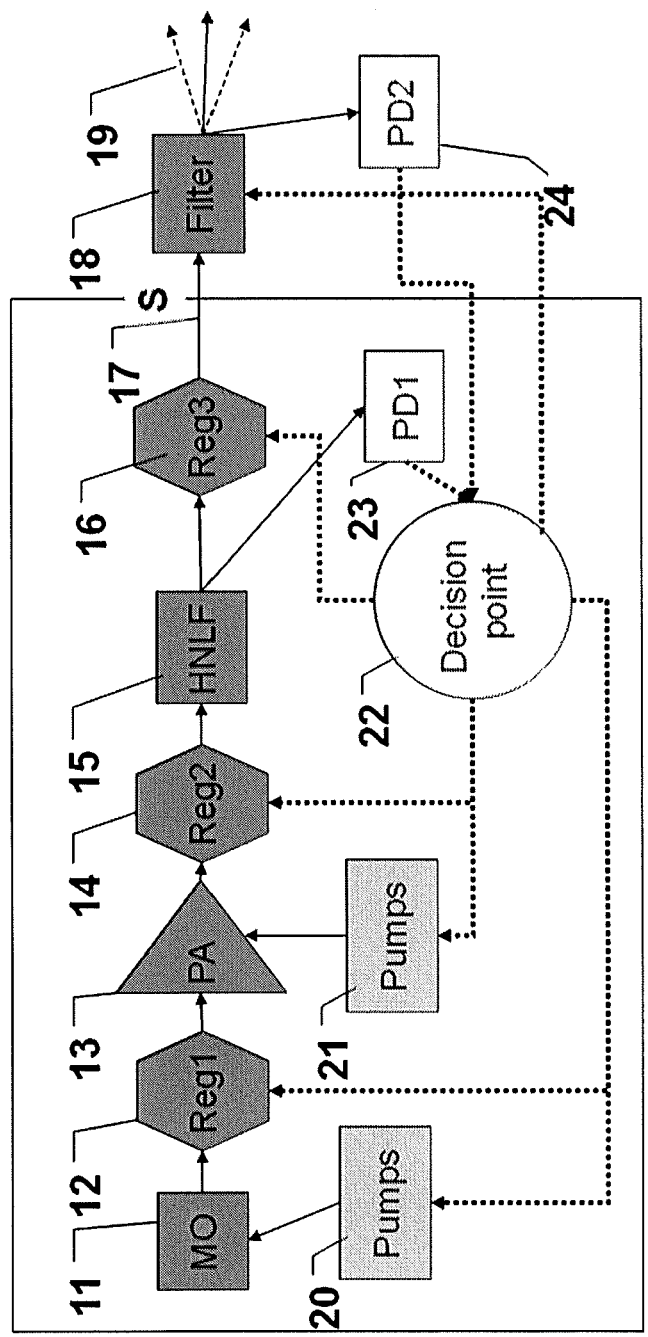
FIG. 1 shows a light source system according to an embodiment of the invention.

Surprisingly the inventors have found that, unlike other types of wideband light sources, supercontinuum light sources may fluctuate in spectral shape on a longer and/or short time scale. The fluctuations in spectral shape may relate only to a narrow range of the spectrum or to a broad part of the spectrum. Such fluctuations may be detrimental to some commercial applications. In particular for applications relying on spectral slicing where the light source system is used to provide a single wavelength or a narrow wavelength range.

In one embodiment the invention therefore seek to provide a method for power stabilisation of a particular spectral part of the optical output for a supercontinuum light source with low loss.

In one embodiment of the invention the light source is a supercontinuum light source. In one embodiment said light source comprises a non-linear fiber, such as e.g. a micro-structured fiber. In one embodiment of the invention said light source comprises at least one optical amplifier, such a pre-amplifier and/or a power amplifier.

In one embodiment of the invention a supercontinuum light source is taken to mean a light source with an optical output spanning over at least one octave with at least 10 µW/nm. In one embodiment the optical output spans over at least one octave with at least 50 µW/nm, such as more than or equal to 500 µW/nm, such as more than or equal to 1 mW/nm, such as more than or equal to 5 mW/nm, such as more than or equal to 10 mW/nm. The spectrum may in one embodiment may also span over more than or equal to 0.5 octave, such more than or equal to 1.5 octave, such more than or equal to 2 octaves.

In one example more than one octave span has been achieved with the nonlinear fiber SC-5.0-1040 from the Danish company Crystal Fiber A/S using this fiber with a peak power of 200 W pumped at 1064 nm. The phrase spanning over at least one octave with at least a specific power value (per nm wavelength) is in this context of the present invention taken to mean that the optical spectrum of the optical output of the light source spans at least an octave defining the outer limits of said spectrum by said specific power value. The spectrum may have holes; however, it is assumed that more than 25% of the spanned spectrum has at least the specific power value. In an embodiment at least 30% of the spanned spectrum has at least the specific power value, such as at least 40%, such as at least 60%, such as at least 80%, such as at least 99%, such as at least 99.9%.

In an embodiment the optical output of the light source may be defined to be at any position along the beam path after which the broadest spectrum within the light source system has been generated. In one such embodiment the light source is a supercontinuum light source. In one embodiment the output of the light source may be defined to be at any position along the beam path after which the highest optical power within the light source system has been generated. In one such embodiment the light source is a high power laser source. In one embodiment the output is defined as above In the event that the light source and the remaining part of the light source system are produced and/or packaged separately it is in one embodiment the output of the light source follow this separation, so that the output is located between the light source and the remaining part of the light source system. In one embodiment of a super continuum light source the output of the light source is at the end of the non-linear waveguide providing a supercontinuum. In one embodiment the output of the light source is after one or more components arranged to spatially shape the optical output, such as collimating the optical output. In one embodiment the light source is a laser with a linear cavity where light is coupled out of the cavity at an end point of the cavity. In one embodiment the output is considered to coincide with said endpoint of the cavity, such as immediately after a semi-transparent mirror or a fiber Bragg grating.

In one embodiment the output is defined as above where the position of the output is set to be the first transition to an unguided region hereafter. For example, for an embodiment where the light source is a supercontinuum light source the widest optical spectrum may be achieved inside the non-linear optical fiber. The output of the light source may therefore in one embodiment be considered to be the exit faced of the non-linear optical fiber where light at this facet exits to an unguided region of the beam path.

In one embodiment of the invention the light source is a super-luminescent diode; however, such light sources rarely fluctuate in spectral shape at least on a relatively short time scale.

In one embodiment of the invention the light source is arranged so that the width of the power spectrum S is so that $w_S \geq 50$ nm, such as $w_S \geq 100$ nm, such as $w_S \geq 200$ nm, such as $w_S \geq 300$ nm, such as $w_S \geq 400$ nm, such as $w_S \geq 500$ nm, such as $w_S \geq 1000$ nm, such as $w_S \geq 1500$ nm, such as $w_S \geq 2000$ nm. In one embodiment this width is determined by the spectral power levels discussed above.

One aspect that makes such light sources stand out is the relatively high spatial quality of the light, which may allow them to be coupled to a fiber, such as a single mode fiber, with relatively low loss. Accordingly, in one embodiment substantially all of the light output of the light source may be coupled to an optical fiber, such as a single mode fiber, such as more than 30% of the output light may be coupled, such as more than 50% of the light, such as more than 70% of the light, such as more than 90% of the light, such as more than 99% of the light.

FIG. 1 shows an exemplary light source system according to the invention 10, with a supercontinuum source 11-17 followed by an optional optical filter 18. In one embodiment the filter is tunable, such as selected from the group of an acousto optical tunable filter, a polychromatic acousto optical tunable filter, an acousto-optic modulator, an electro-optic modulator, and a magneto optic modulator. A tunable filter may in one embodiment be obtained by inserting a prism into the output beam path and allowing an optical fiber to collect the light to be delivered. By rotating the prism a different segment of the spectrum is collected. In one embodiment a prism may provide a residual reflection of the surface of the prism. In one embodiment the detector system is arranged to detect this reflection. In one embodiment the detector system is arranged to have a collecting fiber or detector, close to the output fiber so that the detector system detects a part of the generated spectrum close to the output light collected by the fiber.

In FIG. 1 full lines are optical connections whereas dotted lines are electrical connections. The embodiment shown is intended to show exemplary placements of regulating elements and detector systems, and FIG. 1 therefore shows multiple of each. While this may be preferable in some embodiments other embodiments may be arranged to regulate a single element and a single detector system. Similarly separate elements, such as the booster amplifier, may be optional. Regulating elements may be any active and passive (i.e. non-amplifying) components such as a pump laser and an attenuator, respectfully. A regulating component is a passive component arranged to dampen light. In order to provide efficient feedback via a regulating element the element is often not operated in maximum efficiency on average. The term efficiency is taken to mean that at 100% efficiency the optical output of the delivered light by the system cannot be increased by adjusting the efficiency of the regulating element. In one embodiment a regulating element, such as the filter 18, is operated with an average efficiency of less than 100%, such as less than 99%, such as less than 98%, such as less than 97%, such as less than 95%, such as less than 90%, such as less than 85%, such as less than 60%.

The supercontinuum light source of FIG. 1 comprises a master oscillator 11, which is pumped by one or more pump lasers 20. The optical power output of the master oscillator typically depends on the pump, i.e. optical power of the pump laser(s) 20 when the oscillator 11 is pumped optically. The pump power may in one embodiment be used to control the output of the light source 10 so that the pump laser functions as a regulating element. In one embodiment the master oscillator comprises one or more pre amplifiers. In one embodiment different pumps are used for the laser cavity and at least one of the preamplifiers, where the amplification is typically dependent on the power of the pump source to the amplifier (be it optical or electrical), so that the pump power may in one embodiment be used to control the output of the light source 10 so that the amplifier may function as a regulating element. In one embodiment the master oscillator is followed by a regulating component 12, which may regulate the power of the light. Such a regulating element could e.g. be a variable optical attenuator (VOA), a variable pinhole, a variable beam splitter or similar. In one embodiment the light source comprises one of more polarisation maintaining components. In this embodiment light outside the main polarisation axis may be regarded as lost in terms of supercontinuum generation. In one embodiment the regulating component is a variable polarisation controller.

Figure 10:
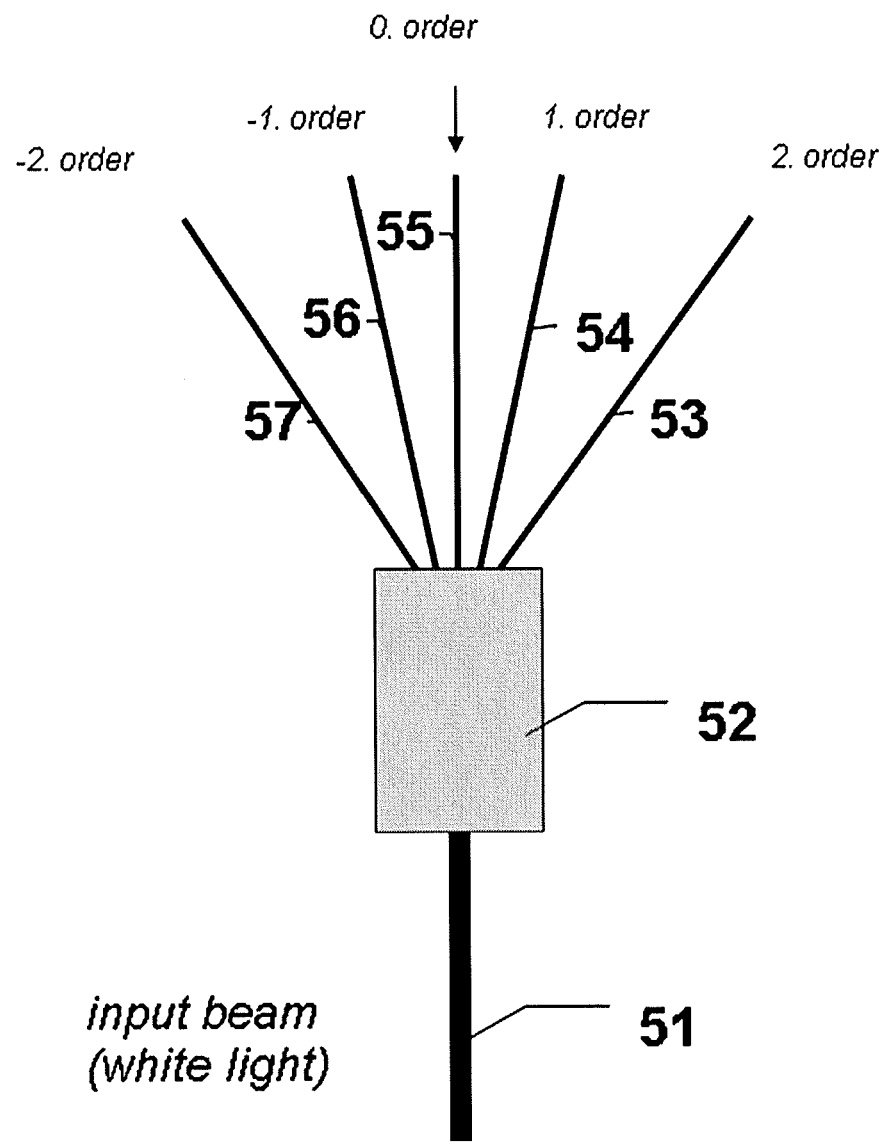
FIG. 10 shows an exemplary angular modulator.

The light is amplified in a power amplifier 13, also referred to as a Booster amplifier. The Booster amplifier may amplify the light to achieve sufficient power to create a supercontinuum in a non-linear fiber 15. In one embodiment the booster amplifier comprises an active fiber with a larger core than standard fibers and/or several Watts of pump power. The Booster amplifier may be pumped by one or more pump lasers 21 which typically influence the amplification of the booster amplifier so that the Booster amplifier may be used as a regulating element e.g. by adjusting the pump power similarly to the pre-amplifier. In one embodiment the optical power pumped into the non-linear fiber 15 is mainly determined by the amplification of the booster amplifier (i.e. the last amplifier) and it may therefore be preferable to use the booster amplifier as regulating element and/or utilize at regulating element after the booster amplifier such as 15-18. In one embodiment the spectral shape of the supercontinuum is affected by the optical power launched into the fiber 15 and it may therefore be preferable either to have the feedback response regulate before the fiber 15 in order to allow manipulation of the spectrum or to regulate after the fiber 15 if changes in the spectrum is not desirable. In one embodiment several multimode pumps are used for the Booster amplifier, as multimode pumps may provide higher pump power than single mode pumps. In one embodiment the Booster amplifier is followed by a regulating component 14 before entering the non-linear fiber 15. The regulating components 14, 16 may have any of the properties discussed regarding the regulating component 12. In one embodiment the non-linear fiber is a microstructured optical fiber. The non-linear fiber 15 converts the relatively narrow band high power light emitted from the booster amplifier 13 to a wideband supercontinuum with a power spectrum S emitted at the output of the light source 17. In one embodiment the non-linear fiber may be followed by a regulating component 16. In one embodiment the light from the output of the light source is filtered by a filter 18 to obtain one or more exit beams 19 comprising spectral slices of the spectrum S each with spectrum $O_1$, $O_2$ and/or $O_N$. In one embodiment the filter is a transmissive spectral filter which absorbs or reflects wavelengths not transmitted and vice versa for a reflective spectral filter. In one embodiment the filter is a bending optical filter (e.g. by refraction or diffraction) which bends some wavelengths relative to other wavelengths, such as indicated in FIG. 1. An example of such a filter is shown in FIG. 10 where the filter 52 accepts the input beam 51 and bends portions of input beam into the $-2^{nd}$, $-1^{st}$, $1^{st}$ and $2^{nd}$ order exit beam. The $0^{th}$ order beam 55 passes through substantially straight through the filter in this embodiment. In one embodiment the $0^{th}$ order beam 55 comprises substantially the same spectral contents as the input beam 51 except for the spectral energy diverted into the higher order exit beams. As mentioned above, the output beam is in one embodiment a higher order exit beam (such as a $1^{st}$ order exist beam) substantially mirrored by another higher order exit beam (such as a $-1^{st}$ order exit beam) arranged to function as a detector beam. Via this mirroring it is in one embodiment possible to provide a feedback response based on the delivered output light of the system without adding optical components into the output beam path. This mirroring is an inherent feature for some filters such as an acousto optical tunable filter (AOTF), such as a polychromatic acousto optical tunable filter in which the output beam direction and position is substantially constant irrespective of the choice of the tunable output wavelength (i.e. the polychromatic AOTF is designed to keep the diffracted wavelengths in the same beam path irrespective of the wavelength). An example of such a polychromatic AOTF is part number #97-0299601 from the company Crystal Technology Inc. The invention is not limited to the first order beams, so that in one embodiment said detector beam selected from the group of a $-3^{rd}$, $-2^{nd}$, $1^{st}$, $0^{th}$, $1^{st}$, $2^{nd}$ and $3^{rd}$ order exit beam.

In one embodiment the optical filter is tunable so that the power and/or wavelength of each of the lines $O_1$, $O_2$, $O_N$ may be varied. In one embodiment the filter functions to deliver a spectral slice O of the spectrum S as the light delivered from the system. The power in the delivered light depends on the corresponding spectral content in the spectrum S and the efficiency of the filter. In one embodiment the efficiency of the filter may be applied to adjust the power of the delivered light so that the filter may also function as a regulating component. An efficiency of 100% corresponds in this context to the regulating element coupling the maximum optical energy from S into the delivered spectral slice O achievable with the specific filter and setup. In one exemplary embodiment the spectral slice O corresponds to the $1^{st}$ order exit beam of the filter whereas a $-1^{st}$ order exit substantially mirrors the spectral slice. In one such embodiment an efficiency of 100% corresponds to delivery of substantially 50% of the light from the spectrum S within the spectral slice set by O when loss is disregarded. In one embodiment at least part of the $-1^{st}$ order, or another output from the filter 18, is directed to the photodiode 24 to provide feedback via a decision point comprised in the detector system. In one embodiment the different spectral slices may have an overlapping optical path. In one embodiment part of the light emitted from the nonlinear fiber (i.e. the output of the light source of the system) is directed to a detector 23, such as a photodiode via a tap path (discussed below). In one embodiment part of the light directed to the filter 18 is directed to a photodiode 24, such as one of the output beams 19 or residual reflections originating from the front or back side of the filter 18. The electrical output from the detector 23 and/or 24 may be directed to a decision point 22. This decision point may provide a feedback response via electrical signal to one or more of the components 12, 14, 16, 18, 20 and 21. In one embodiment there are no regulating components in the beam path (12, 14 and 16) and the optical output is controlled by sending a feedback signal to the Booster pump(s) 21.

In one embodiment the light source system is implemented using one or more fiber optic components, such as fiber lasers and/or fiber amplifiers. In one embodiment the optical path from one component to the next comprises a fiber such as a single mode fiber. In one embodiment some or all of the fiber of the light source is polarizing and/or polarisation maintaining.

In one embodiment the master oscillator comprises a mode locked laser, such as according to one of the embodiments provided in Danish patent application PA 2007 01814. In an embodiment the master oscillator comprises a solid state laser, such as a diode pumped solid state laser.

Figure 8:
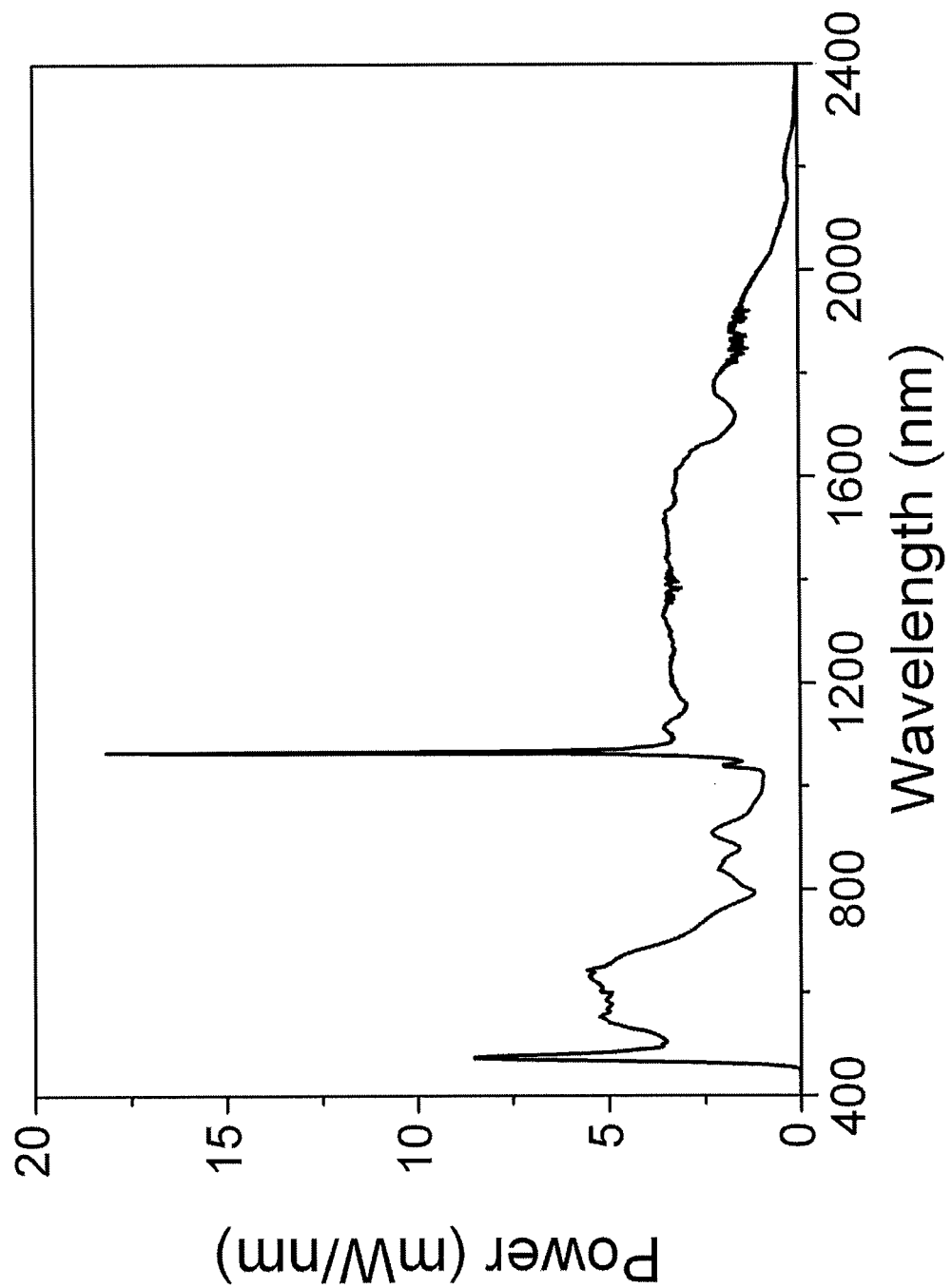
FIG. 8 shows a supercontinuum spectrum of a light source according to an embodiment of the invention.

FIG. 8 shows the supercontinuum spectrum of a supercontinuum source according to an embodiment of the invention.

Figure 2:
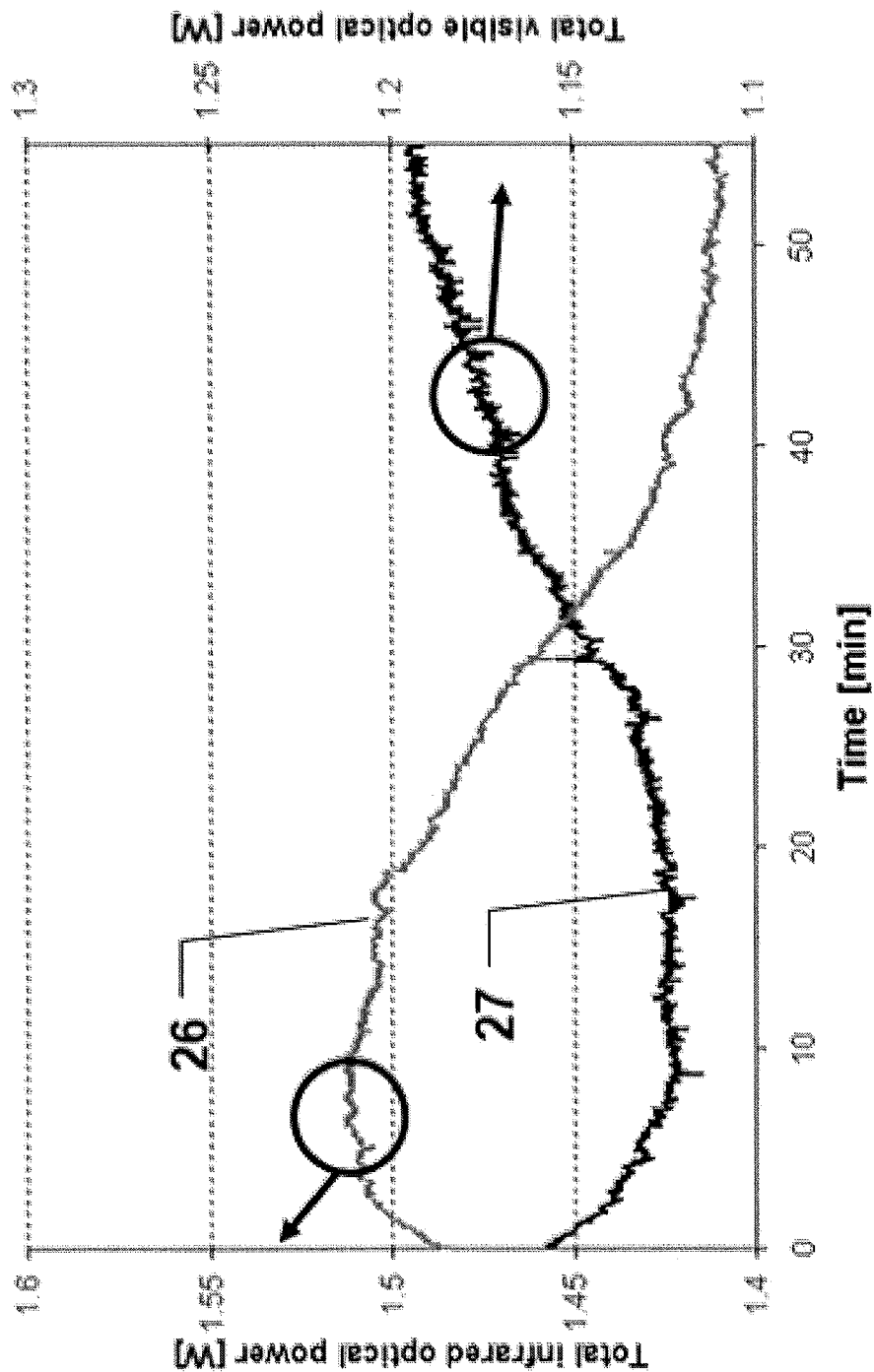
FIG. 2 shows data from the infrared (26) and visible (27) optical output of a supercontinuum light source where the invention has not been implemented over a short time scale.

FIG. 2 shows fluctuations of the infrared (26) and visible (27) optical output power of a supercontinuum light source such as sketched in FIG. 1 over a time-period of an hour. The two curves are out of phase. This illustrates that there is potential for improving the performance of such a supercontinuum light source system in terms of power stability.

Figure 4:
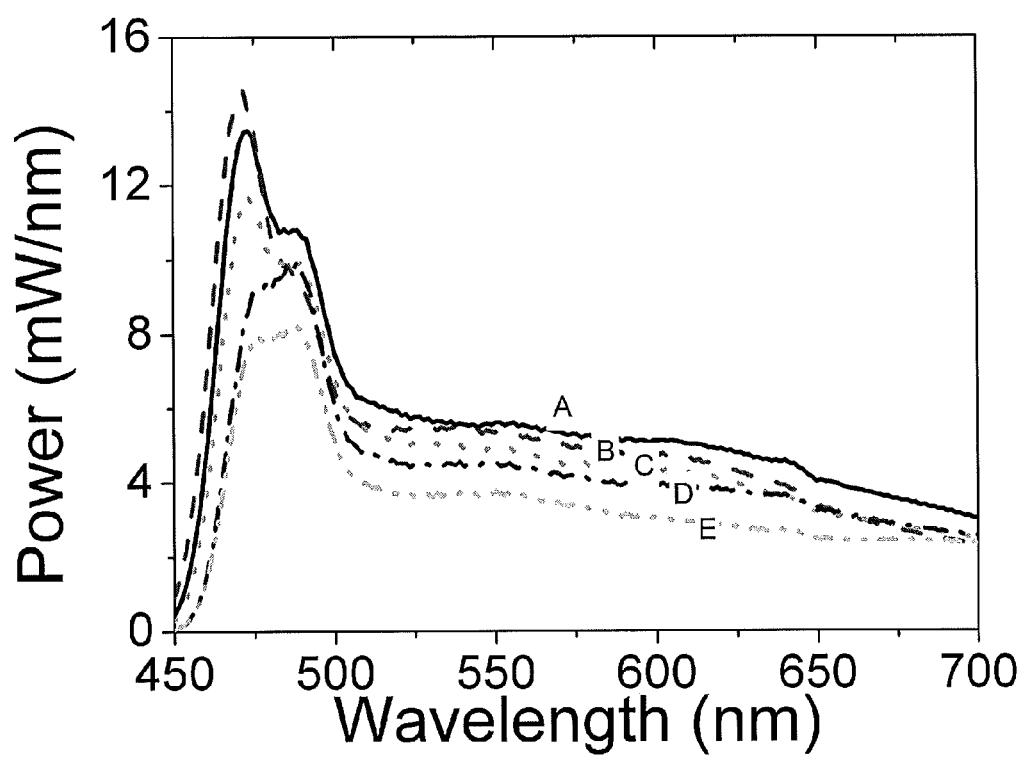
FIG. 4 shows supercontinuum spectra after 0 hours (A), 188 hours (B), 260 hours (C), 305 hours (D) and 450 hours (E) of operation.
Figure 5:
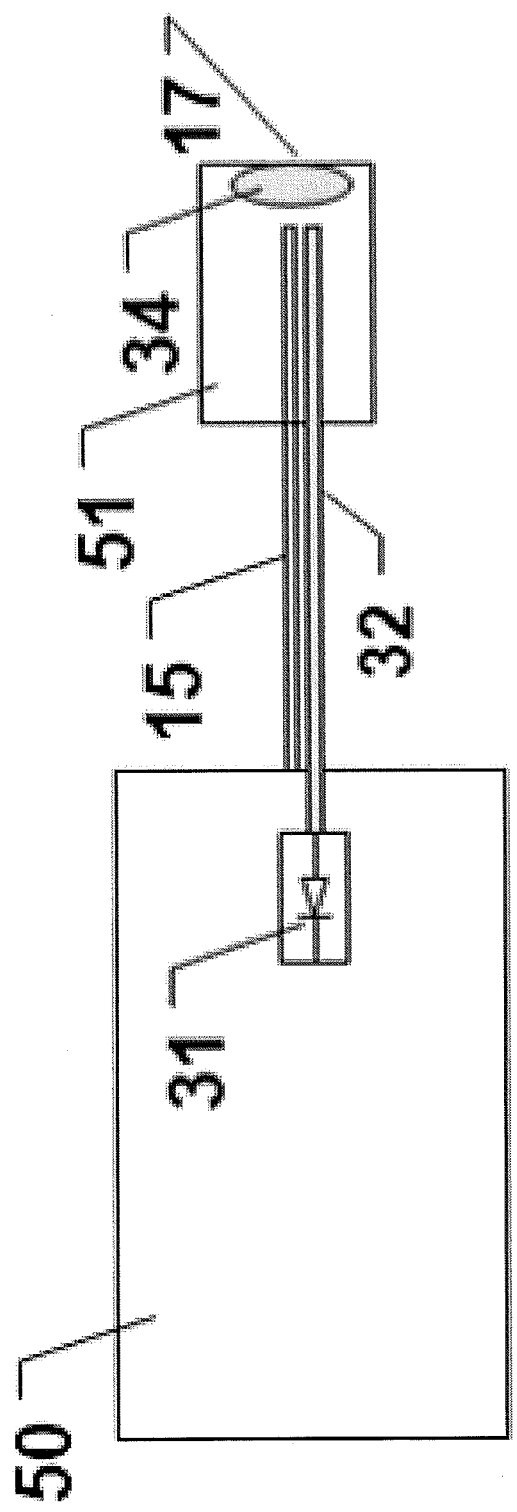
FIG. 5 shows a light source according to an embodiment of the invention where the reflecting surface providing the residual reflection is situated in an optical head (50), which is situated outside the main body (comprising the light source) of the system (51).

FIG. 4 shows changes in the visible part of the optical output of a supercontinuum light source after 0 hours (A), 188 hours (B), 260 hours (C), 305 hours (D) and 450 hours (E) of operation. There appears to be a peak at short wave lengths, which decays at a rate different from the remaining spectrum. Furthermore it may be noted that similar experiments have shown that the power in close to 640 nm and in the near infrared (such as from 800 to 2000 nm) may decay at a different rate from the remaining spectrum.

Figure 9:
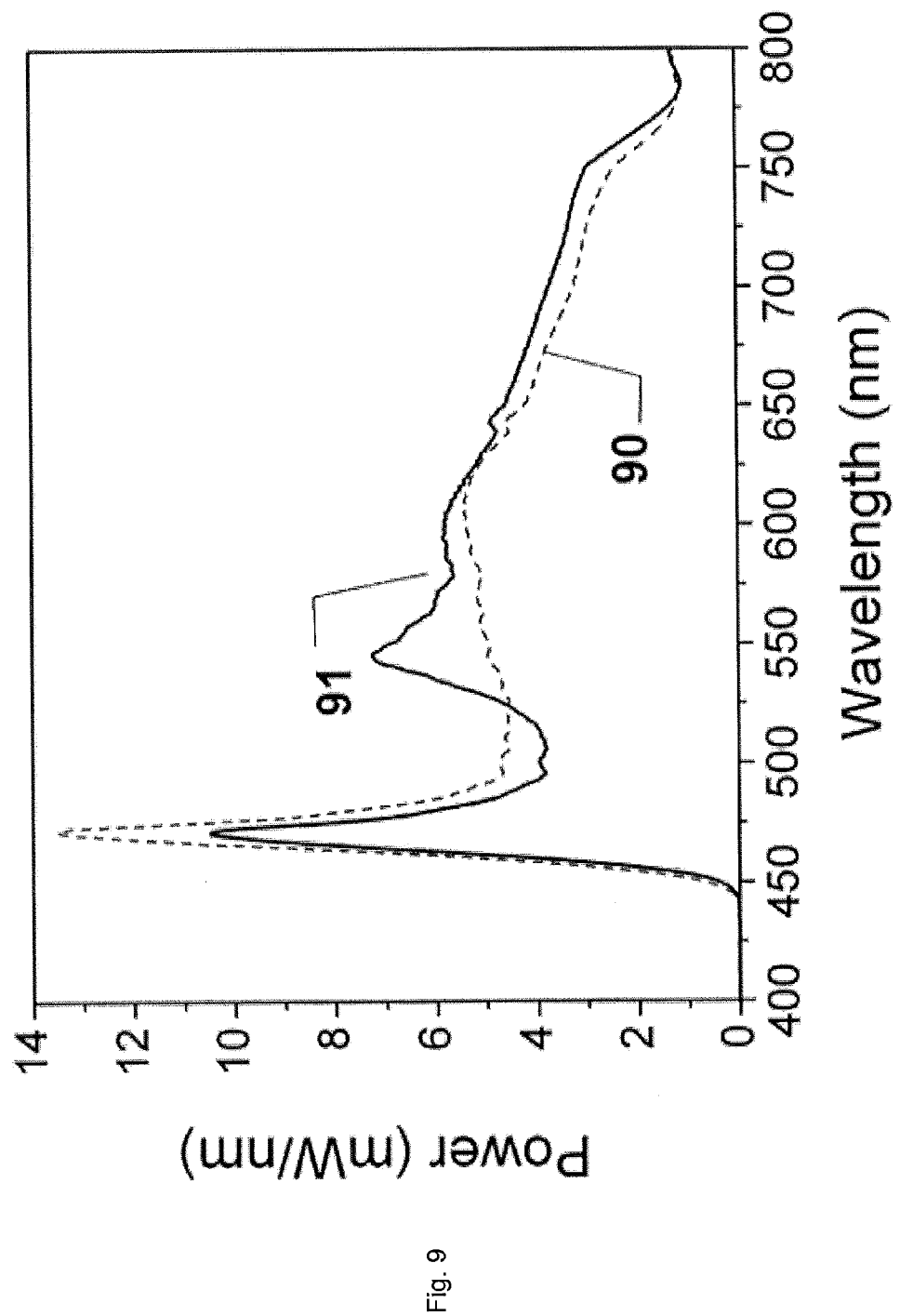
FIG. 9 shows supercontinuum spectra after 0 hours (90) and 48 hours (91).

FIG. 9 shows changes in the optical output of a supercontinuum light source after 0 hours (90) and 48 hours (91). The figure shows that different parts of the spectrum may have a different aging profile, e.g. there are large changes close to 550 nm but nearly no changes around 600 nm. Thus in this example a feedback system detecting at e.g. 550 nm will not provide a stable optical output at 600 nm.

FIGS. 2, 4 and 9 illustrate that a stabilization of an optical light source system providing a spectral slice of the power spectrum of the light source(s) of the system will likely prove valuable for applications where a substantially constant optical output at a specific wavelength range or a single wavelength is required. Accordingly, in one embodiment of the invention the light source system comprises at least one detector system arranged to produce at least one feedback response arranged to influence the power spectrum O of the light source system. In the present context influence may in principle be any adjustment of the power spectrum. In one embodiment influence may be a power level adjustment of substantially all wavelengths in the spectrum whereas in one embodiment influence is a relative adjustment of one part of the spectrum relative to another. In one embodiment the feedback response is arranged to keep an integral over D·S substantially constant so that a feedback response from the detector system is an error signal as a function of the deviation of the optical output from a mean value.

In one embodiment the said feedback response comprises a feedback signal, such as a control signal, to control at least one optical component. In one embodiment feedback is provided to a photosensitive material, which changes absorption at least for the spectral range of O as function of the incoming power in and/or around this spectral range and/or as a function of the mentioned electrical signal.

As will be apparent for the skilled person it is often possible to provide a feedback response by adjusting one or more of several possible points in a light source system. In one embodiment a feedback response is provided by controlling an optical component of the light source performing other functions such as amplifiers or seed laser as discussed above. Possible control nodes are illustrated in FIG. 1 as 12, 14, 16, 18, 20 and 21; however, in one embodiment a control node may be incorporated internally in one or more of the optical components 11, 13, 15, such as by including a variable attenuator in the master oscillator or booster amplifier. In one embodiment a feedback response is provided by controlling an optical amplifier of the light source, such as by adjusting the pump energy. In the example of FIG. 1 this is exemplified as control of pumps 20 and/or 21. In some embodiments it may be preferential to provide a feedback response by controlling the last amplifier as this often has a very direct impact on the power of the system. If feedback response is provided by controlling the master oscillator, one may run the risk of not saturating the Booster and thereby obtaining an increased contribution to the optical power from spontaneous emission. In one embodiment the spectral shape of the generated supercontinuum depends on the polarisation of the entering pulse. In such an embodiment a feedback response may be provided by directing a control signal to a variable polarization controller.

In one embodiment a feedback response is provided by controlling one/or more devices for dampening the beam e.g. by absorption and/or be dumping of energy by guiding and/or reflection power from the optical path of the light source. Such dampening may in principle also be performed after the output of the light source and/or after the output of the light source system. Examples of possible dampening points are shown in FIG. 1 as 12, 14, 16 and 18.

One embodiment the feedback response is arranged to adjust at least one of the group of a pump laser of the light source, an amplifier of the light source system, a pump source to an amplifier of the light source system, a dampening component, a variable polarization controller, a reflective component, a transmissive component, and the output efficiency of a filter.

In one embodiment of the invention the spectral response of the detector system D overlaps the spectral shape O of the optical output of the light source system. In one embodiment D overlaps with one or more wavelengths, which substantially follow the fluctuation of O. In one embodiment the width of the $w_O$ is less than the width of the detector response $w_D$, which may provide stability as the feedback response will be regulated based on all of the relevant spectral power. In one embodiment the spectral shape of the spectral response of the detector system is arranged so that substantially all wavelengths within the spectral response share substantially the same fluctuation. From FIG. 4 several areas of the spectrum may be selected so that in one embodiment D is comprised in the range of 350 nm to 700 nm, such as in the range 400 to 600 nm, such as in the range 450 nm to 500 nm. In one embodiment D is comprised in the range of 500 nm to 700 nm or D is comprised in the range of 700 nm to 2200 nm. In one embodiment D is a range of wavelengths comprising O so that a feedback response may be generated relative to the overall variation of a larger wavelength range comprising O. In one such example O is wavelengths about 540 nm, while D encompasses wavelengths from 450-700 nm. In one embodiment it is preferential to a have a relatively wideband detector system. An example of such an embodiment may be a light source system where two or more spectral slices are provided as optical output simultaneously and/or consecutively and it has been found that these may be sufficiently stabilized by a detector sensitive to the spectral band they cover. In one embodiment it is preferential that the detector system has a response substantially corresponding to the optical output spectrum O to likely provide the most accurate feedback.

In one embodiment the width of the spectral response of the detector system is chosen so that $w_D \leq 300$ nm, such as $w_D \leq 150$ nm, such as $w_D \leq 75$ nm, such as $w_D \leq 25$ nm, such as $w_D \leq 10$ nm, such as $w_D \leq 5$ nm, such as $w_D \leq 1$ nm. In one embodiment $w_D \geq 1$ nm, such as $w_D \geq 5$ nm, such as $w_D \geq 10$ nm, such as $w_D \geq 25$ nm, such as $w_D \geq 75$ nm, such as $w_D \geq 150$ nm, such as $w_D \geq 300$ nm, such as $w_D \geq 500$ nm. In one embodiment $w_D \leq 0.8\ w_S$, such as $w_D \leq 0.7\ w_S$, such as $w_D \leq 0.6\ w_S$, such as $w_D \leq 0.5\ w_S$, such as $w_D \leq 0.4\ w_S$, such as $w_D \leq 0.3\ w_S$, such as $w_D \leq 0.2\ w_S$, such as $w_D \leq 0.1\ w_S$, such as $w_D \leq 0.05\ w_S$ such as $w_D \leq 0.01\ w_S$. In one embodiment $w_D \geq w_O$, such as $w_D \geq 5\ w_O$, such as $w_D \geq 10\ w_O$, such as $w_D \geq 25\ w_O$, such as $w_D \geq 75\ w_O$, such as $w_D \geq 150\ w_O$, such as $w_D \geq 300\ w_O$, such as $w_D \geq 500\ w_O$.

As will apparent to a skilled person several approaches may be applied to obtain a desired spectral response of the detector system. In one embodiment the detector system comprises a tap path arranged to collect a fraction of the light of the optical output of the light source and/or the light source system, such as from a residual reflection or an exit beam from a filter e.g. an AOTF, and transport/guide this light to a photodetector in the detector system. In one embodiment the spectral response of the tap path influences the spectral response of the detector system. Such dependencies may for example arise due to a spectral dependency of a reflection which the tap path is arranged to collect and/or a due to a spectral dependency in the coupling of light to the tap path such as wavelength dependence in coupling to a fiber forming the tap path. The spectral response may further be designed through the choice of photo-detector and/or one or more filters. An example of photo-diode with a limited spectral response in the visible relative to other Si-diodes commonly applied is Si photodiode S8265 from Hamamatsu, Hamamatsu City, Japan.

One advantage of collecting light from the light source is that one manufacturer may produce the light source and another may produce the particular system, such as a filter, applied to obtain O from S. In this way a feedback may be implemented and tested by the manufacturer of the light source alone or the manufacturer of the filter alone. One advantage for the optical output of the light source system may be that the selectivity of the spectral response of the detector system may be less critical as a feedback response may be produced based on the optical output itself. Furthermore, the tap path may be arranged to collect a fraction of the light after the light has passed one or more components belonging to the system for which the light system is applied. In this way adjusting the power of the optical output of the light source system may compensate variations in performance of such components.

Depending on the application of the light source it may be desirable to have a detector system with an adjustable spectral response. In one embodiment the detector system comprises adjustable filter to obtain an adjustable spectral response, such as an adjustable notch filter. An adjustable spectral response may also be achieved by combination of an optical switch matrix and multiple detectors. In this way the switch may direct light to a detector sensitive to a desired wavelength range. In one embodiment the detector system comprises a spectrometer so that the feedback response may be based on a selectable amount of the detected spectrum.

In one embodiment the tap path is arranged to collect the light from a reflection or transmission from one or more components selected from the group of a glassplate, a wedge, a dichroic mirror, a lens, a prism, a pellicle beam splitter, an end cap, an optical fiber, an angle cleave and a grating. In an embodiment the tap path comprises an optical fiber. Here a multimode optical fiber may be preferable is it often collects more light than a single mode fiber and thereby provides a stronger signal. Commonly multimode fibers have a larger NA compared to single mode fibers. In one embodiment the light is collected into the tap path by the end facet of this fiber. In this case the fiber is referred to as a collecting fiber. This coupling may in one embodiment be enhanced by application of coupling optics such as a lens. In one embodiment the tap path is arranged to collect a residual reflection and/or transmission preferable from a component, which is also required in the corresponding system without feedback. In one embodiment said residual reflection is at least partially diffuse and or stray. In one embodiment a stray reflection is taken as a reflection reflecting light at least partly out of the system i.e. so that this reflection is not applied or collected by other components of the system.

In one embodiment said transmissive optical component is a lens or part of a lens system. In one embodiment the transmissive optical component is a waveguide where the residual reflection may arise originated from an end facet of said waveguide. In one embodiment the detector system is at least partially placed in an assembly to hold the output of the light source 51 in which case the electrical signal is fed back to the decision point by an electrical connection, which may be electrically shielded. In this example the input to a tap path or a photo detector may be in mechanical communication with the output, which may provide a compact and/or mechanically stable implementation. In an embodiment of the invention the detector system comprises a tap path, such as an optical collecting fiber, having a first end (i.e. an input end) positioned substantially in the vicinity of the output arranged to collect light due to the residual reflection and said first end is in optical communication with at least one photo-detector. In one such embodiment the tap is formed by a multimode optical fiber arranged to guide the collected light to a photo-detector of the detector system. In one embodiment the tap path is arranged to collect residual light within less than 5 cm of the output, such as a less than 3 cm, such as less than 1 cm, such as less than 5 mm, such as less than 2 mm, such as less than 1 mm, such as less than 0.5 mm, such as less than 0.2 mm, such as less than 0.1 mm. In one embodiment close spacing between first end and an end of an output fiber is achieved by mounting the two fibers in a ferrule designed to hold to fibers. Such ferrules are sometimes referred to as a double or dual ferrule in the art. Note that the output fiber end in this context is not necessarily the output of the light source or the light source system but in principle be any suitable fiber end having a transition to an unguided section.

Figure 3:
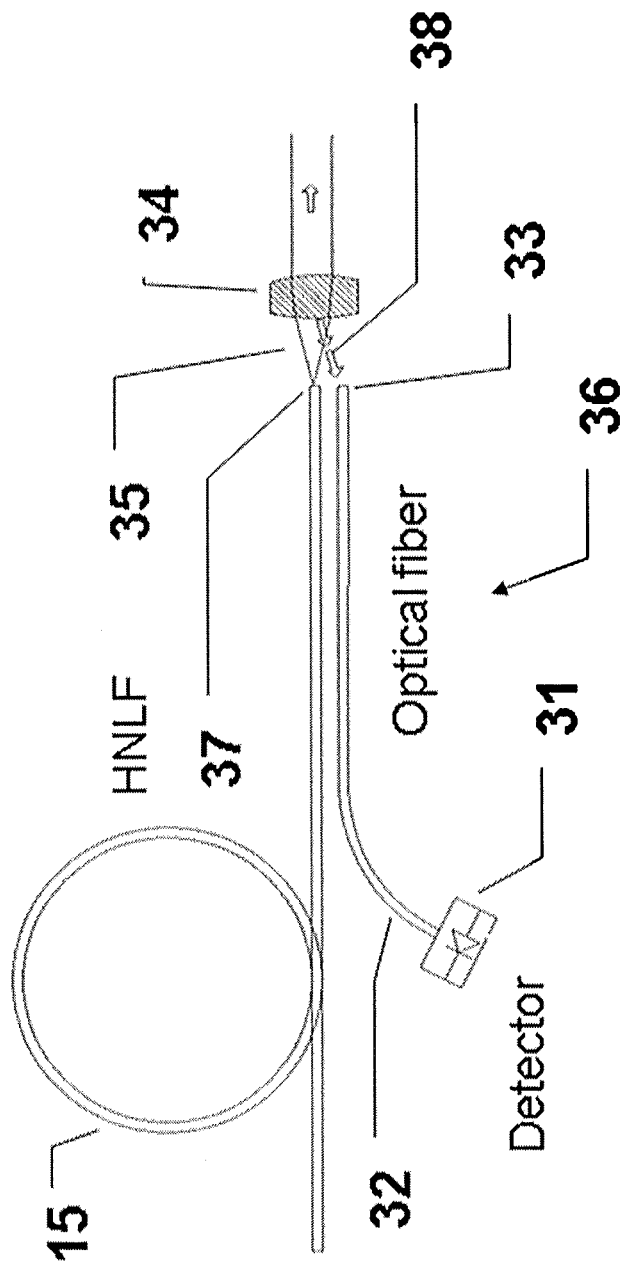
FIG. 3 shows a light source system for delivery of light according to an embodiment of the invention.

FIG. 3 shows part of a light source system according to the invention. In this exemplary embodiment a non-linear fiber 15 generates a wideband or supercontinuum spectrum which is emitted at the output end of the fiber 37, which is considered to be the output of the light source. Hereafter the beam 35 expands and is in this embodiment collimated in free-space by a lens system comprising at least one lens 34. The air-glass interface results in a stray reflection 38, which is collected by the detection system 36 via the tap path constituted by a collecting fiber 32, such as a multimode fiber. The fiber 32 guides at least part of the reflected light to a detector 31. In one embodiment the two fiber ends 33, 37 are mechanically mounted in the same mount to provide a compact and mechanical stable implementation. It is noted that this implementation of a detection system may be implemented without reducing the performance of the system as the stray reflection (38) may be inherent to the system.

Figure 6:
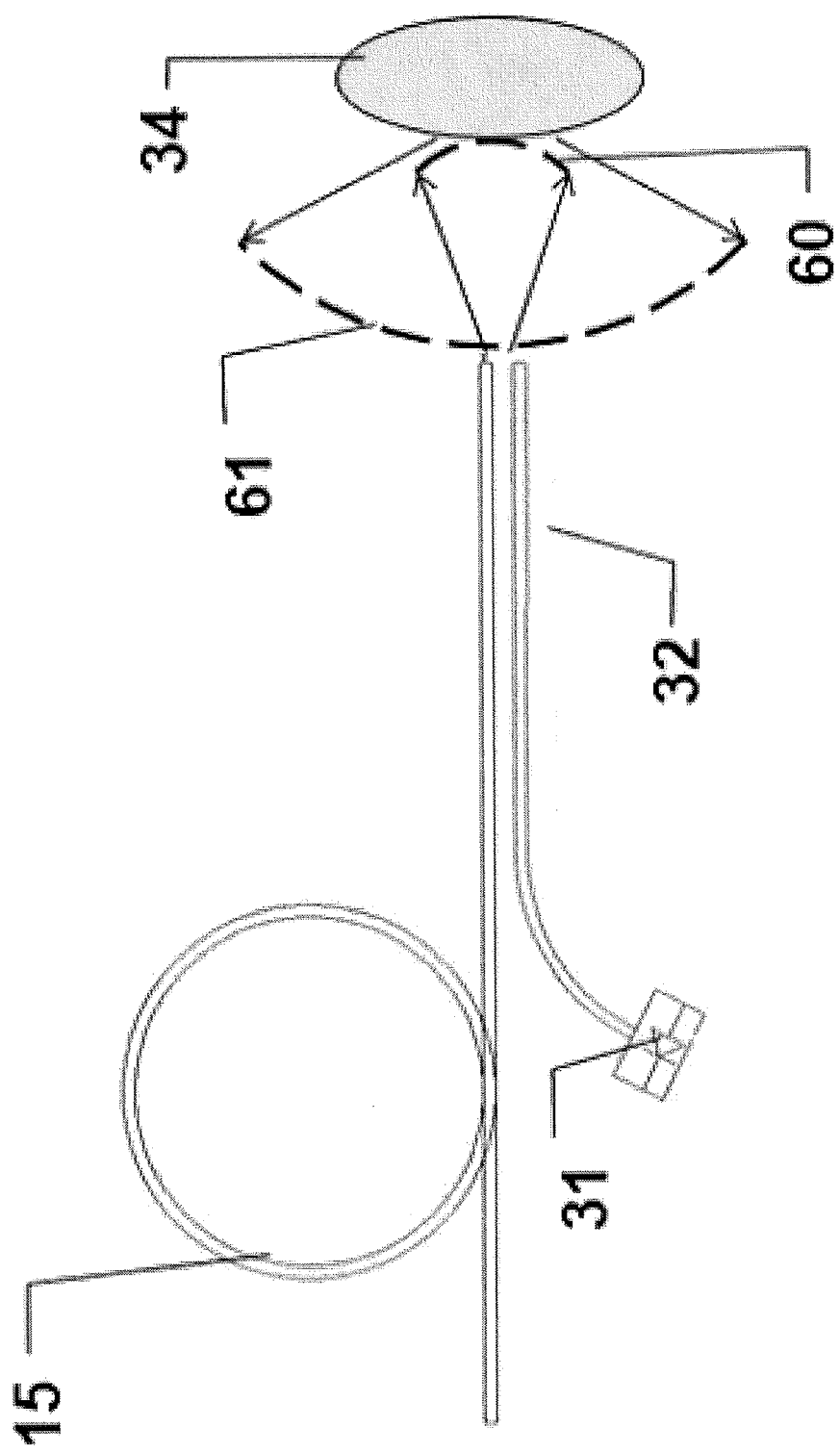
FIG. 6 shows the light propagation from the highly nonlinear fiber to the lens system as well as an exemplary residual reflection detected by a detector system.

FIG. 6 shows an example of an optical system according to the invention, such as the system shown in FIG. 2. The wavefront 60 at the lens system 34 results in a residual reflection illustrated by the wavefront of the reflected beam 61 as it has propagated back to the output at the end facet of the non linear fiber 15. The latter wavefront extends beyond the non-linear fiber and part of the light may thus be collected by the collecting fiber 32.

Figure 6B:
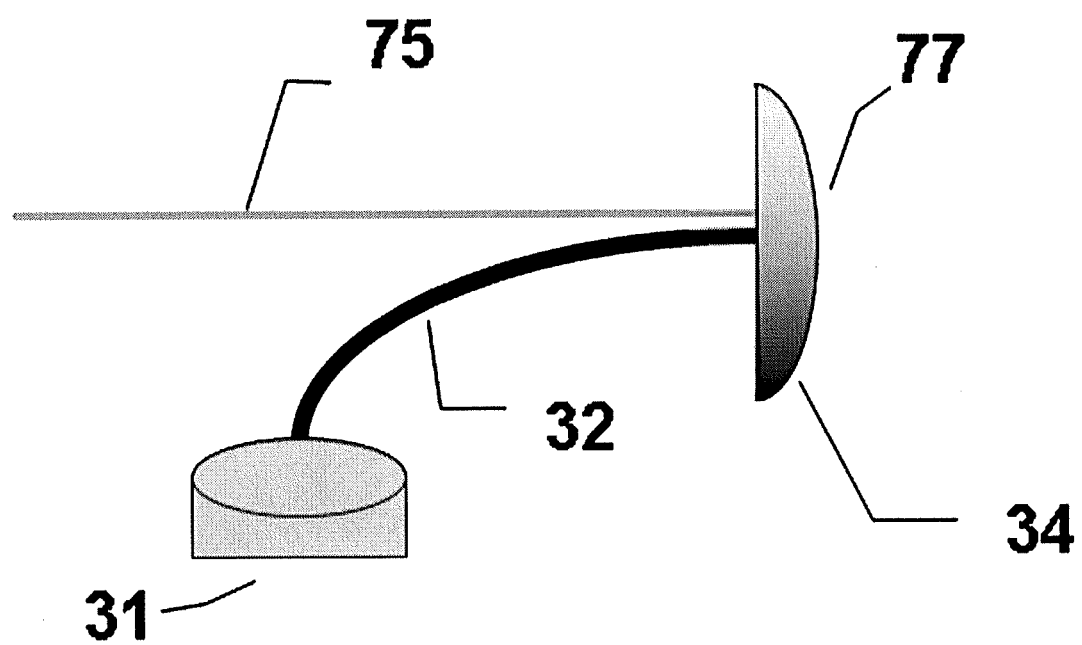
FIG. 6B shows one embodiment of the invention where a fiber from the light source system is fused to a lens. The exit surface from the lens provides a residual reflection which is used to provide feedback according to the one embodiment of the invention.

In FIG. 6B the optical fiber 75 is fused to the lens 34. The fiber 75 may in principle be any fiber of the system, such as for example a delivery fiber which delivers the light from the light source or the from the light source system (e.g. into a microscope) or a non-linear fiber for generating of a supercontinuum. The collecting fiber 32 is in this embodiment fused to the lens in order to collect light from a residual reflection from the exit surface 77 caused by transition to the unguided section, i.e. the glass-air interface. The collecting fiber guides the collected light to a detector 31 which is connected to a detector system in order to facilitate feedback.

In one embodiment of the invention the detection system is used for high power fiber lasers and hence the non-linear fiber shown in FIGS. 3 and 6 is replaced by either a high power amplifier fiber or a delivery fiber.

Figure 7A:
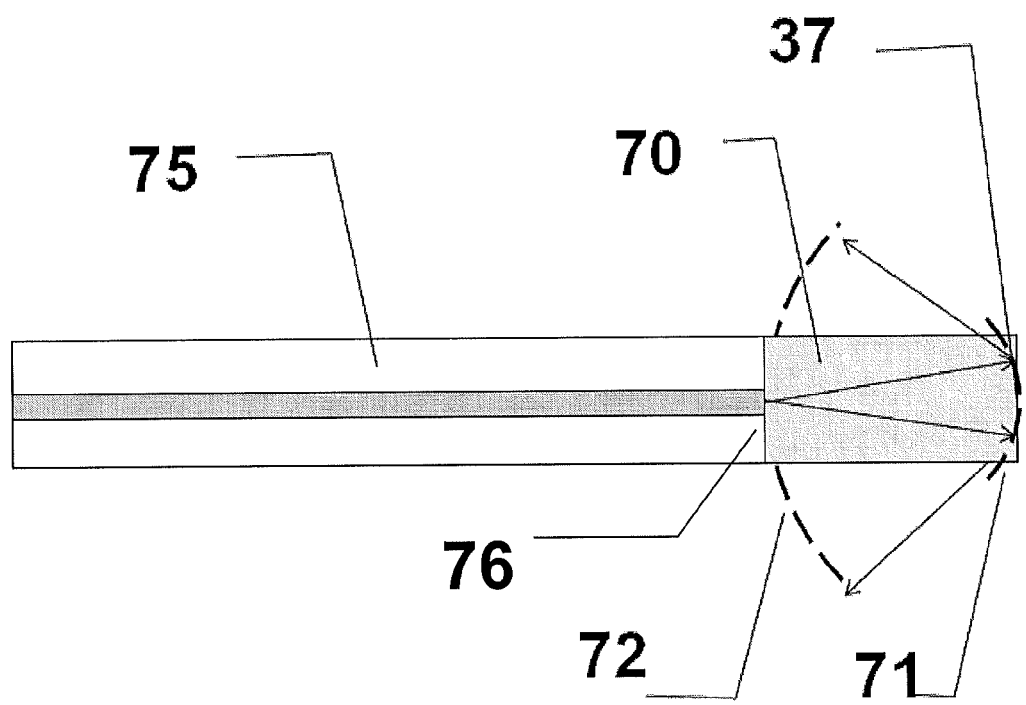
FIG. 7A shows one embodiment of the invention, where the highly nonlinear fiber has an end cap that functions to reduce light reflected into the core of the nonlinear fiber at the fiber-air interface. The fiber-air interface results in a residual reflection which may be used to provide feed-back according to the embodiment of the invention.
Figure 7B:
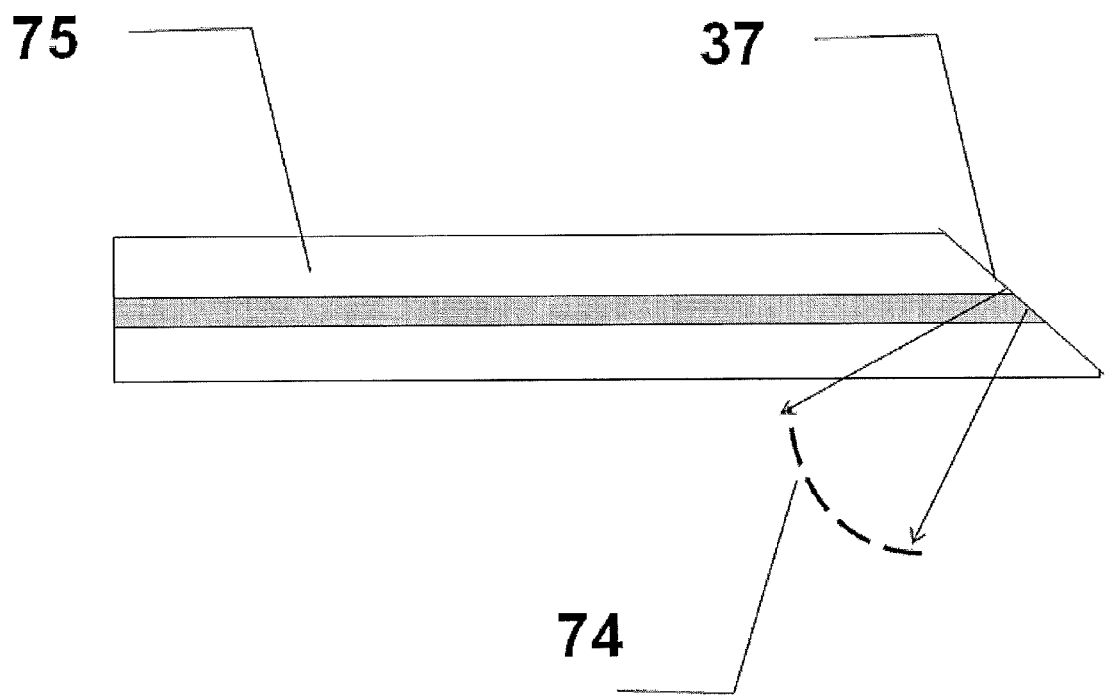
FIG. 7B shows one embodiment of the invention, where the highly nonlinear fiber is angle cut to reduce light reflected into the core of the nonlinear fiber at the fiber-air interface. The fiber-air interface results in a residual reflection which may be used to provide feed-back according to the embodiment of the invention.

FIG. 7A and 7B show two embodiments of the invention where the end facet of the optical fiber comprises a reflecting surface having a residual reflection suitable for providing feedback.

In FIG. 7A there is a piece of transparent unguiding material 70 fused to the end facet 76 of the optical fiber 75 for example in the form of a non-linear fiber or a delivery fiber. This piece of material is commonly referred to as an end cap and may e.g. consist of a silica glass. In the case where the optical fiber is a holey fiber, the end cap may be constructed by collapsing the air holes in the fiber. In one embodiment the end cap is spliced to the optical fiber. The end cap does not necessarily have the same width as the fiber. In the end cap the beam is unguided and hence expands. At the end facet of the end cap 37 the light is partially reflected back into the end cap. Here it expands further giving a wavefront of a residual reflection 72. Due to said expansion light reflected into the core of the optical fiber from the fiber-air interface is reduced relative to a fiber without an end cap. In one embodiment of the invention a photo detector or a collecting fiber is arranged to detect the residual reflection 72. In one embodiment the photo detector or the collecting fiber is arranged to collect the residual reflection in a plane parallel with the end facet 76 of the optical fiber 75, e.g. by placement of the photo detector or end facet of a collecting fiber next to the optical fiber 75, such as next to the end facet of the optical fiber. In one embodiment the photo detector or the collecting fiber is arranged to collect the residual reflection in a plane perpendicular with the end facet 76 of the optical fiber 75, e.g. by placement of the photo detector or end facet of a collecting fiber next to the optical fiber 75. In one embodiment the photo detector or end facet is placed at another angle such as 45 degree to the end facet 76 of the optical fiber 75. In either case the end facet of the collecting fiber may improve collection of light by being butt coupled to the end cap (note that the end cap may be larger than shown). In this way a compact system may be constructed where feedback is provided utilizing a residual reflection which is otherwise difficult to avoid when advantages of isolating the core of the optical fiber 75 from reflected light at the end facet 76 is via an end cap is utilized.

In FIG. 7B the optical fiber 75 is angle cut which is a common method of isolating the core of the optical fiber 75 from reflected light at the end face. Accordingly, the end facet 37 has an angle to the optical axis (which is parallel with the core). In this example the part of the light that is reflected from the end facet 37 propagates with an angle relative to the optical axis and thus forms a residual reflection illustrated by the wavefront 74. Similarly this wavefront may be utilized for feedback similarly to the wavefront 72 of FIG. 7a. Similar placements of a photodetector or collecting fiber may be applied to obtain a compact system.

For both examples the detection of the reflection light may be performed by the same principles as the reflection from the lens system, i.e., either the light is collected in a collecting fiber and guided to a photodetector or a photodetector is placed so close to the fiber that it may detect the light. In one embodiment the collecting fiber is a multimode fiber. In one embodiment the collecting fiber is parallel to the optical fiber at least substantially near the end of the fiber 75.

Figure 11:
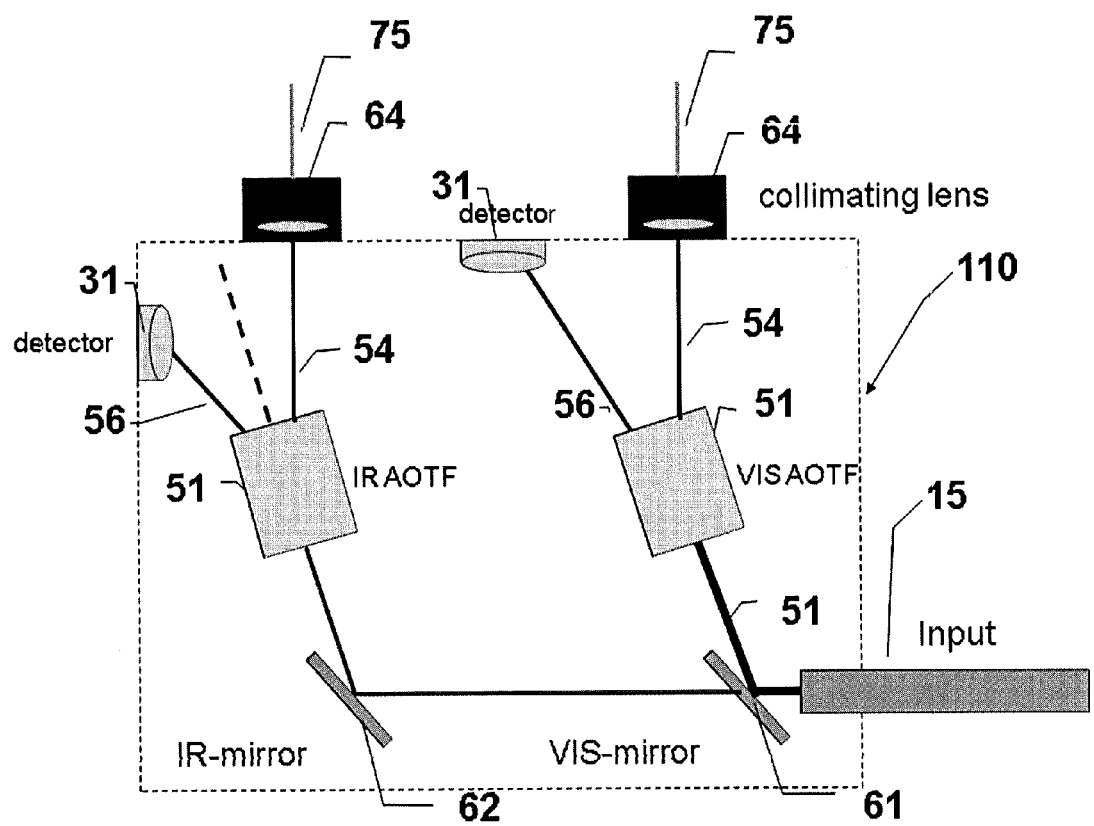
FIG. 11 shows an exemplary system for launching a selectable part of a wide spectrum into optical fibers using two AOTF filters each providing an output beam and a detector beam.

FIG. 11 shows an exemplary output system 110 included in one embodiment of the light source system. The output system allows for the selection of visible (VIS) and infrared (IR) spectral slices of a supercontinuum provided as input by the non-linear fiber 15. The light from the fiber 15 is directed to the dichroic mirrors 61 and 62 reflecting VIS and IR light, respectively. After reflection the VIS and IR light is guided to a VIS AOTF and IR AOTF, respectively. Each of the AOTF filters provides an output beam 54 and a detector beam 56 which in one embodiment is the $1^{st}$ and $-1^{st}$ order transmissions, respectively. The detector beams 56 are directed to detectors 31 which are connected to a detector system controlling a feedback response. As mentioned above, one way of providing feedback is by adjusting the efficiency of the filters 51. The output beams are directed to the collimating lenses 64 and from there coupled to the fibers 75. In one embodiment the fibers 75 are connected to a fluorescence microscope where the light may be applied to activate fluorophores. In such applications it is practical to be able to change the wavelength which may be performed by tuning the AOTF.

The invention is further exemplified by the embodiments presented in the following items:

Items

1. A light source system arranged to emit light with a power spectrum O having a width $w_O$, said system comprising a light source arranged to emit light with a power spectrum S having a width $w_S$, said light source system further comprising at least one detector system having a spectral response D at least partly overlapping S, said spectral response D having a width $w_O$ where $w_D < w_S$, said detector system being arranged to produce at least one feedback response arranged to influence the power spectrum O of the light source system.
2. The light source system of item 1 wherein D at least partly overlaps O.
3. The light source system of item 1 and/or 2 wherein $w_O < w_D$.
4. The light source system of any of the preceding items where $w_D \leq 0.8\ w_S$, such as $w_D \leq 0.7\ w_S$, such as $w_D \leq 0.6\ w_S$, such as $w_D \leq 0.5\ w_S$, such as $w_D \leq 0.4\ w_S$, such as $w_D \leq 0.3\ w_S$, such as $w_D \leq 0.2\ w_S$, such as $w_D \leq 0.1\ w_S$, such as $w_D \leq 0.05\ w_S$ such as $w_D \leq 0.01\ w_S$.
5. The light source system of any of the preceding items where $w_D \leq 300$ nm, such as $w_D \leq 150$ nm, such as $w_D \leq 75$ nm, such as $w_D \leq 25$ nm, such as $w_D \leq 10$ nm, such as $w_D \leq 5$ nm, such as $w_D \leq 1$ nm.
6. The light source system of any of the preceding items where D is comprised in the range of 350 nm to 700 nm, such as in the range 400 to 600 nm, such as in the range 450 nm to 500 nm, such as in the range 450 nm to 500 nm.
7. The light source system of any of the preceding items where D is comprised in the range of 500 nm to 700 nm.
8. The light source system of any of the preceding items where D is comprised in the range of 700 nm to 2200 nm.
9. The light source system of any of the preceding items wherein $w_S \geq 50$ nm, such as $w_S \geq 100$ nm, such as $w_S \geq 200$ nm, such as $w_S \geq 300$ nm, such as $w_S \geq 400$ nm, such as $w_S \geq 500$ nm, such as $w_S \geq 1000$ nm, such as $w_S \geq 1500$ nm, such as $w_S \geq 2000$ nm.
10. The light source system of any of the preceding items wherein said light source is a supercontinuum light source.
11. The light source system of any of the preceding items wherein said light source comprises a non-linear fiber.
12. The light source system of any of the preceding items wherein said light source comprises a micro-structured fiber.
13. The light source system of any of the preceding items wherein said light source comprises at least one optical amplifier.
14. The light source system of any of the preceding items wherein said light source is a super-luminescent diode.
15. The light source system of any of the preceding items wherein substantially all of the optical output of the light source may be coupled to an optical fiber, such as more than 30% of the optical output may be coupled, such as more than 50% of the light, such as more than 70% of the light, such as more than 90% of the light, such as more than 99% of the light.
16. The light source system of any of the preceding items wherein substantially all of the optical output of the light source may be coupled to an optical single mode fiber, such as more than 30% of the optical output may be coupled, such as more than 50% of the light, such as more than 70% of the light, such as more than 90% of the light, such as more than 99% of the light.
17. The light source system of any of the preceding items wherein said feedback response comprises an electrical feed back signal to control at least one optical component.
18. The light source system of any of the preceding items wherein said feedback response is arranged to adjust at least one of the group of a pump laser of the light source, an amplifier of the light source system, a pump source to an amplifier of the light source system, a dampening component, a variable polarization controller, a reflective component or a transmissive component.
19. The light source system of any of the preceding items wherein said feedback is arranged to keep an integral over D·S constant.
20. The light source system of any of the preceding items said light source and/or light source system comprising an output arranged to emit light in an output path and said detector system further comprising at least one tap path arranged to collect a fraction of the light in the output path.
21. The light source system of any of the preceding items wherein said tap path is arranged to collect at least part of a reflection or transmission of a component of the output path.
22. The light source system of any of the preceding items wherein said tap is arranged to collect the light from a reflection or transmission from one or more components selected from the group of a glassplate, a wedge, a dichroic mirror, a prism, a pellicle beam splitter and a grating.
23. The light source according to any of the preceding items wherein said tap path comprises an optical collecting fiber, such as a multimode optical fiber.
24. A light source system for delivery of light comprising a light source having an output arranged to emit light in an output path said output path comprising an unguided section and an at least partially transmissive optical component wherein said optical component has at least one residual reflection and a detector system is arranged to detect said residual reflection.
25. The system of item 24 wherein the residual reflection is at least partially diffuse and/or stray.
26. The system of items 24 or 25 wherein the detector system comprises a photo-detector substantially in the vicinity of the output arranged to collect light due to the residual reflection.
27. The system of any items 24 to 24 wherein the detector system is at least partially placed in an assembly to hold the output of the light source.
28. The system of any items 24 to 25 wherein the detector system comprises an optical collecting fiber having a first end positioned substantially in the vicinity of the output arranged to collect light due to the residual reflection and said first end is in optical communication with at least one photo-detector.
29. The system of item 28 wherein the optical collecting fiber is a multi mode fiber.
30. The system of any of items 28 to 29 wherein said first end is at least partially placed in an assembly to hold the output of the fiber-optic light source.
31. The system of any of items 24 to 30 where said at least one transmissive optical component is selected from the group of a glassplate, a wedge, a dichroic mirror, a prism, a pellicle beam splitter and a grating.
32. The system of any of the items 24 to 31 further comprising any of the features of the items 1 to 21.
33. A method of stabilizing an optical output power spectrum O of an optical light source system, said power spectrum O having a width $w_O$, said system comprising a light source arranged to emit light with a power spectrum S having a width $w_S$, said light source system further comprising at least one detector system having a spectral response D at least partly overlapping S, said spectral response D having a width $w_D$ where $w_D<w_S$, said detector system being arranged to produce at least one feedback response arranged to stabilize the power spectrum O of the light source system.
34. The method of item 33 further comprising any of the features of items 1 to 32.
35. An apparatus comprising the light source according to any of the items 1 to 23.

The invention has been discussed in the foregoing at least partly by way of exemplary embodiments, which must not be taken to limit the invention as defined by the attached set of claims. It should be noted that any reference numerals provided in the claims are exemplary only and should not be considered to limit the claim or the item. Furthermore, it should be noted that claim limitations referring to elements such as light and reflections which occur when an optical system is in operation may be understood as the features of the system being arranged to provide such light and reflections in operation. Accordingly, such claim limitations may be applied to the optical system when the system is idle.

The invention claimed is:

1. A light source system for delivery of light comprising:
a supercontinuum light source having an output arranged to emit light with a bandwidth spanning over at least one octave with at least 50 μW/nm in an output path,
said output path comprising an unguided section and a partially transmissive optical component, wherein said optical component provides a residual reflection of said entire bandwidth of the light when the system is in use, wherein the residual reflection has a substantially same spectral shape as a spectral shape of the output path, and a detector system is arranged to detect said residual reflection via a tap path arranged to collect at least part of said residual reflection wherein said detector system being arranged to produce at least one feedback response arranged to affect light delivered by said system.

2. The system of claim 1 wherein said residual reflection originates from a transition from said unguided section to said transmissive optical component.

3. The system of claim 1 wherein said residual reflection originates from a transition from said transmissive optical component to said unguided section.

4. The system of claim 1 wherein said tap path comprises a collecting fiber, such as a multimode fiber.

5. The system of claim 1 where said transmissive optical component is a lens or part of a lens system.

6. The system of claim 1 where the transmissive optical component is an optical fiber having an end facet providing a residual reflection.

7. The system of claim 4 wherein said collecting fiber is arranged to collect at least part of said residual reflection substantially in the vicinity of an output of the light source.

8. The system of claim 5 wherein said optical collecting fiber is arranged to guide the collected part of the residual reflection to at least one photodetector.

9. The system of claim 1 wherein said detector system comprises a spectrometer.

10. The system of claim 1 wherein light delivered by said system is stabilized at least partly via detection of at least part of said residual reflection.

11. A light source system according to claim 1 arranged to emit light with a power spectrum O having a width $w_O$ where said output is arranged to emit light with a power spectrum S having a width $w_S$ and said detector system having a spectral response D at least partly overlapping S, said spectral response D having a width $w_D$, wherein said detector system being arranged to produce at least one feedback response arranged to stabilize the power spectrum O of the light source system.

12. The light source system of claim 11 wherein D at least partly overlaps O.

13. The light source system of claim 11 where $w_D \leq 0.4 w_S$.

14. The light source system of claim 12 where D is comprised in the range of 350 nm to 700 nm.

15. The light source system of claim 12 wherein D is tunable.

16. The light source system of claim 1 wherein said feedback response is arranged to adjust at least one of the groups of a pump laser of the light source, an amplifier of the light source system, a pump source to an amplifier of the light source system, a dampening component, a variable polarization controller, a reflective component, a transmissive component, an output efficiency of a filter and an output efficiency of an AOTF.

17. An apparatus comprising the light source according to claim 1.

* * * * *